United States Patent Office 2,855,925
Patented Oct. 14, 1958

2,855,925
PRESSURE SENSITIVE ADHESIVE ARTICLE CONTAINING DEXTRAN

Leo J. Novak, Dayton, Ohio, assignor to The Commonwealth Engineering Company of Ohio, Dayton, Ohio, a corporation of Ohio No Drawing. Application January 12, 1954
Serial No. 403,631

14 Claims. (Cl. 128—156)

This invention relates to pressure sensitive adhesive article containing dextran.

Various substances have been and are currently used as adhesives, including protein and carbohydrate materials such as soy protein, dextrins, animal glue, etc. These have the disadvantage of being readily degraded by bacteria and enzymes to which they may be exposed in use, with adverse effect on their adhesiveness. The adhesives comprising the proteins, particularly, have the disadvantage of comparatively poor flow characteristics at otherwise useful concentrations of 10–15% by weight and of being adversely affected if subjected to alkaline conditions.

In general, also, the pressure-sensitive characteristics of the proteins and of carbohydrates heretofore used as adhesives, are not entirely satisfactory. In order to improve these characteristics, rosins and/or resins are widely used as modifiers for them. However, the inclusion of the modifiers detracts from the utility of the adhesives for various uses, electrical uses, for instance, due to the generally inferior dielectric properties of the rosins, resins and known plasticizers, the dielectric properties of these modifiers being so poor that the pressure-sensitive adhesive tapes available up to now have not been used as extensively in the electrical industry as would appear to be warranted by superficial consideration of them.

A further disadvantage of some adhesive tapes intended for surgical purposes, for example in making tapes of the type marketed under the trade mark "Band-Aid," is that it is advisable to take precautions to avoid contact between the adhesive and an open wound not only to avoid tearing of the wound when the tape is pulled off, which is always advisable, but also because the adhesive may infect the wound and absorption into the body through the wound may lead to untoward physiological reactions.

An object of this invention is to provide pressure-sensitive adhesive tapes having tackiness and adhesive characteristics.

Another object is to provide novel pressure-sensitive surgical adhesive tapes carrying an adhesive which, if accidentally absorbed into the body through an open wound, is absorbed and assimilated in the system without harmful effect.

A further object is to provide pressure-sensitive tapes carrying a tacky adhesive having stable characteristics and adhesiveness without requiring the use of extraneous modifiers.

Still another object is to provide pressure-sensitive tapes having satisfactory dielectric properties.

These and other objects are accomplished by the present invention which provides tapes comprising a suitable backing carrying, as the adhesive component, dextran.

The dextrans are high molecular weight polysaccharides made up of anhydroglucopyranosidic units joined by molecular structural repeating alpha-1,6 to non-alpha-1,6 linkages, at least 50% of these linkages being, apparently, of the alpha-1,6 type. The dextrans vary widely with respect to their properties, including their molecular weight, molecular structural repeating alpha-1,6 to non-alpha-1,6 linkages ratios, and water-sensitivity.

These dextrans may be obtained in various ways. They may be obtained, for example, by enzyme synthesis from sucrose, in the presence or absence of bacteria and cellular debris. Proceeding in accordance with one method, a culture of a suitable microorganism, such as those of the *Leuconostoc mesenteroides* and *L. dextranicum* types, may be prepared, inoculated into a sucrose solution containing appropriate inorganic salts and nitrogenous material, and the whole incubated until maximum dextran synthesis is achieved. This is "whole culture" synthesis effected in the presence of the bacteria and cellular debris. Or the culture of the microorganism may be filtered to obtain a filtrate containing the dextran-synthesizing enzyme, and the filtrate, the enzyme isolated therefrom or an aqueous solution of the enzyme of suitable enzyme potency, may be introduced into the sucrose solution and the mass held until the dextran is synthesized. This is "filtered enzyme" synthesis effected in the substantial absence of bacteria and cellular debris.

In either method, the native dextran obtained has a very high molecular weight, generally measurable in the millions. It may be precipitated from the fermentate by the addition of a precipitant therefor such as a lower aliphatic alcohol or ketone, freed of the precipitant, purified, dried and, preferably, reduced to particulate condition.

Depending upon the microorganism used, the dextran obtained as described may be readily water-soluble, soluble in water under special conditions, or substantially water-insoluble. Thus, the dextrans from the microorganisms (or their enzymes) bearing the NRRL (Northern Regional Research Laboratory) designations: *Leuconostoc mesenteroides* B–512, B–119, B–1190 and B–1146 are smooth, lustrous elastic gums, readily soluble in water to give clear or comparatively clear solutions. Those bearing the NRRL designation *L. m.* B–1144 and B–1384 can be dissolved in water by proper handling.

For example, native *L. m.* B–1144 dextran is a crumbly gum soluble in water if isolated from the precipitate by lyophilization followed by very slow addition of water with constant agitation and final autoclaving. Native *L. m.* B–1384 dextran occurs as a tough gum but can also be dissolved in water if it is isolated by the addition of an aqueous paste thereof to ethanol, and thereafter water is added to the isolated dextran very slowly, with agitation, the addition of the water being followed by autoclaving. On the other hand, the native dextran from microorganisms (and their enzymes) bearing the NRRL designations *L. m.* B–742, B–1191, B–1196, B–1208, B–1216, and B–523, *Streptobacterium dextranicum* B–1254 and *Betabacterium vermiforme* B–1139 are soluble in aqueous alkaline solution, but may be dispersed in water.

Adhesive compositions may be obtained by dissolving or dispersing all of these dextrans in water. However, such compositions are not adapted to the present purpose. It has been observed that films of the dextrans formed by depositing an aqueous solution thereof on a support syngerize and gradually lose their moisture, becoming non-tacky as a result. Dextran coatings so obtained would require remoistening before use in order to restore them to the adhesive condition.

Pregummed remoistenable articles are desired for various purposes and tapes having remoistening properties could be useful. However, the present invention is concerned more particularly with pressure-sensitive tapes one surface of which remains in tacky condition over long periods of storage and which, in response to pressure exerted on the backing, adheres firmly to a base or support or when wrapped on an article so that the convolutions overlap, to the backing. The problem has been to prepare compositions comprising dextran and having such properties that, applied to a backing tape and dried thereon to remove readily available liquid medium used in their preparation, the adhesive coating, while permitting ready separation or unrolling of layers, would remain in the tacky condition for indefinite periods of time.

The present invention provides such tapes. In accordance with one preferred embodiment of the invention, tacky, pressure-sensitive tapes are obtained by applying to one surface of a suitable backing a high viscosity dextran-water system containing a hygroscopic agent and, optionally, depending on the intended use of the tape, an antiseptic agent, and drying the coating. Alternatively, the backing may be coated with a high viscosity dextran-water system, dried, coated with the hygroscopic agent, which may or may not be mixed with an antiseptic, and again dried.

In preparing the compositions, the amount of dextran dissolved or dispersed in water to produce the desired high viscosity will vary depending on the molecular weight of the dextran and the solubility or dispersibility thereof in water. The desired viscosity is that at which the mass is comparatively thick but can be readily spread on the backing to provide it with a smooth, even coating. Smaller amounts of the native dextrans, particularly those of low water-solubility, are required than for partial dextran hydrolyzates of relatively low molecular weight or dextrans of relatively low molecular weight obtained by direct biosynthesis under controlled conditions. In general, the dextran may be dissolved or dispersed in water to a concentration of 5% to 25%, by weight, concentrations of 10% to 20% being satisfactory.

Suitable hygroscopic agents include glycerin, potassium acetate, urea, various glycol derivatives and other polyhydroxy hygroscopic materials of that general type. The proportion of hygroscopic agent to water may vary and may be from 5% to 25%, by weight. Compositions in which the concentration of the hygroscopic agent is from 5% to 20%, based on the total weight of the composition, are usually satisfactory. Glycerin is a presently preferred hygroscopic agent.

Any of the native dextran types may be used for the present purpose, whether soluble, difficulty soluble or substantially insoluble in water. In addition, there may also be used dextrans of molecular weight lower than the native materials and obtained for instance by partial hydrolysis of native dextran. This permits of a wide choice of dextrans having a molecular weight in the range 5000 to $150 \times 10^6$ as determined by light scattering measurements, including so-called "clinical" dextran obtained by partially hydrolyzing the native product to obtain dextran of molecular weight adapted for intravenous injection and having a molecular weight of 25,000 to 200,000, preferably 60,000 to 90,000. As is known, in conventional clinical dextran production involving acid hydrolysis, there are obtained a plurality of fractions, including, in addition to the desired fraction, a low fraction having a weight range between 5000 and 50,000 and a very high molecular weight fraction. All of these fractions, isolatable from the hydrolyzate, may be used, as may, also, dextrans obtained by other methods than those mentioned herein, such as by bacterial conversion of 1, 4 linkages of dextrins to 1, 6 linkages of dextrans.

The ingredients, i. e., the selected dextran, water and hydroscopic agent may be formulated to a composition of viscosity adapted for spreading on a backing to provide it with a coating which, after drying under controlled, moderate conditions, retains sticky, tacky characteristics over substantial periods of time after spreading and when packaged properly. When removed from the package the coating is fresh, soft, and adhesive, meeting the requirements for a pressure-sensitive adhesive tape, and remains in that condition at room temperature long enough to permit manipulation of the tape.

The tapes of the invention may include other components such as gauze adhered to a portion of the adhesive surface and intended to overlie a wound or the like in use, i. e., the tape may be of the "Band-Aid" type, and the gauze may be impregnated with any appropriate antiseptic such as one of the phenols or antiseptic phenol derivatives.

The dextran composition may be applied to the tape backing in any suitable way, as by spreading with a doctor blade, or by brushing or by moving the tape continuously over a wick or over a rotating roller partially submerged in the composition.

The product may take a form other than a tape. It may take the form of a short strip or of a patch or "plaster" and may have adhered to its adhesive surface, and also carrying an exposed coating of the dextran adhesive, a pressure-relieving disc, oval or the like member of appropriate shape and size designed to fit over a corn, callus or the like, i. e., the product may be a "corn plaster," a "callus pad," etc. The portion of the tape adapted to contact the corn or other affected area may carry an active treating agent such as phenyl salicylate or the like. It may also be a counter-irritant and rubefacient plaster such as a "mustard" plaster in which the dextran adhesive is admixed with powered mustard, or it may be any other kind of plaster in which the dextran adhesive is used in conjunction with an agent or agents which heal or sooth affected parts. The coating applied to the backing may comprise, in addition to the dextran, various fungicides, bactericides and other active medicants or modifiers including softeners for indurated skin areas.

The backing may be of various types depending on the use for which the pressure-sensitive article is intended, and may be conventional fabric, commingled fibers as in a non-woven fabric, or non-fibrous film, such as a strip of cellophane, or a synthetic resin particularly polyethylene, vinyl resins, polyamides of the nylon type or "Dacron." For application to the skin, the backing is usually a woven fabric, e. g., woven cotton, whereas for application to electrical parts it may advantageously be of porous type like a woven glass fabric. When the backing is a strip of transparent film, such as cellophane, the product is similar to that marketed under the trade designation "Scotch tape."

Application of the coating may be to one or both sides of the backing, and if the backing is of the porous type it can be provided on both sides thereof with the pressure-sensitive tacky adhesive by an impregnating operation.

Inert fillers may be included in the dextran adhesive applied to backings intended for industrial use, such as finely ground mica, ground silica (quartz), ground glass or combinations thereof. Unlike some of the pressure-sensitive tapes and the like of the prior art, no special precautions are required in packaging the tape or the like except that, when intended for application to the skin, it should be packaged under sterile conditions. Exposure of the tape to high humidities during handling is preferably avoided.

In another embodiment of the invention, the dextran is dissolved in a non-aqueous solvent therefor such as dimethyl formamide, aminoethyl-ethanolamine, morpholine, ethanol formamide, methyl Cellosolve acetate, "Ketosol" Solvent 75, formamide, synethetic polyamino polycarboxylic acids and their salts of the kind available commercially under the trademark "Versene," the solutions being prepared under heating, if necessary. The dextran may also be dissolved in such solvents therefor as fused hydroquinone, fused resorcinol, or fused acetamide, or it may be dissolved in the hygroscopic agent, water being omitted. For example, the dextran may be dissolved in hot glycerine or hot ethylene glycol, i. e., in the hygroscopic agent heated to a temperature below the boiling point. When heat is used in preparing the viscous solutions, the latter are preferably spread on the backing without prior cooling, but may be cooled to the extent that the dextran is not thrown out of solution, if desired. Aqueous sodium hydroxide solutions of dextrans such as native B–523 dextran and similar dextrans which are substantially insoluble in water but soluble in the aqueous alkaline medium, may also be used.

Instead of dextran, there may be used various dextran derivatives or conversion products which, after application from aqueous or non-aqueous solution or dispersion and drying, exhibit tacky characteristics. A particularly effective dextran derivative for this use is dextran xanthate, a new product the preparation of which is disclosed in the pending application of L. J. Novak and W. S. Hogue, Serial No. 414,862, filed March 8, 1954, now abandoned. When the xanthated dextran is soluble in water, aqueous solutions thereof may be used, with or without the addition of a hygroscopic agent such as glycerin or one of the other hygroscopics mentioned herein. Or non-aqueous solutions or dispersions of the xanthated dextran may be prepared and applied to the backing, such as solutions thereof in formamide.

In general, the dextran may be rendered tacky by treatment with a basic polyhydroxy liquid with or without the addition of water.

The following example illustrates a typical embodiment of the invention.

Example I

Fifteen parts by weight of particulate, purified native L. m. B–512 dextran are dispersed in 85 parts by weight of glycerol with moderate heating to 50° C. The mass thus obtained, after cooling to room temperature, has satisfactory flow properties. It is spread by means of a doctor blade on a strip of cotton fabric about 1-inch wide. Cotton gauze is then adhered to the strip, at approximately the center thereof, to form a tape similar to a "Band-Aid," which, after drying at 50° C., is pressure sensitive, that is the portions of the tape lying on either side of the gauze pad are tacky and when pressed onto the skin adhere to it firmly to maintain the gauze pad in place over a cut or the like. The tacky portions of the tape stuck directly to the skin are not harmful even if minor abrasions are covered by it, since the dextran is safely absorbable.

Example II

Twenty parts by weight of L. m. native B–523 dextran, in particulate condition, are mixed with 80 parts by weight of formamide to obtain a soft mass applicable to a backing by means of a doctor. It is applied to a 2-inch wide woven glass fabric, dried, and used as electrical insulation.

Example III

Fifteen parts by weight of L. m. B–512 dextran having an average molecular weight of about 30,000 are dissolved in 75 parts of water and 10 parts of glycerin are added, with stirring. The mass is spread on a strip of cotton fabric 1-inch wide adapted to be used as the supporting and retaining member of a tape similar to a "Band-Aid," and dried.

Example IV

Twenty parts of L. m. native B–1144 dextran, in finely divided form, are mixed with 80 parts of morpholine with heating to 100° C. Three parts of powdered mustard are then stirred into the mixture, which is thereafter spread by a doctor blade on a woven cotton backing and allowed to dry in the air to obtain a mustard plaster for application to the skin.

Example V

Fifteen parts of L. m. native B–1384 dextran, in finely divided condition, are intimately mixed with 85 parts of ethylene glycol with heating to 50° C. The mixture is spread on a narrow (1-inch) strip of cellophane and then dried in the air. This non-fibrous adhesive tape can be rolled up on a support from which it can be readily pulled off and used for sealing purposes.

The tape may be rolled upon itself, with or without a supporting core and is readily peeled off without loss of the adhesive coating. It may be placed flat on a base or wound spirally on an electrical part or the like, and when subjected to light pressure, as by the hand, it adheres firmly to the base, or to the backing when spirally wound. It can be pulled off the base without difficulty when desired. If will be understood that the base may be an area of the human body.

If desired, rosin or compatible synthetic resins, as for instance polystyrene, may be incorporated with the dextran adhesive. However, the use of such additives, or of plasticizers other than the hygroscopic agents which tend to exert a plasticizing effect, is not required in order to obtain a product having satisfactory tack and adhesiveness.

It will be apparent that the invention provides novel pressure-sensitive adhesive tapes and the like having utility for a wide range of purposes. The dextran adhesive has the advantage of good flow property at useful concentrations, resistance to bacterial and enzymatic attack under normal conditions, and has a considerable cost advantage over various plastics and synthetic resins proposed for use as adhesives previously.

Since various changes and modifications may be made in practicing the invention without departing from the spirit and scope thereof, it is to be understood that it is not intended to limit the invention except as defined in the appended claims.

I claim:

1. A pressure-sensitive adhesive article comprising a backing and a surface on the backing consisting essentially of a predominant amount of a dextran and a relatively minor amount of a liquid hydroscopic agent compatible with the dextran and sufficient to maintain the dextran in a tacky condition for an indefinite period of time under normal temperature conditions after drying of the surface on the backing at moderate temperature to remove the readily available liquid from the surface, said tacky dextran fixing the article firmly on a base when the article is pressed on a base with the tacky dextran surface in contact therewith.

2. Pressure-sensitive adhesive corn plasters and callus pads comprising a backing and a surface on the backing consisting essentially of a predominant amount of a dextran and a relatively minor amount of a liquid hydroscopic agent compatible with the dextran and sufficient to maintain the dextran in a tacky condition for an indefinite period of time under normal temperature conditions for drying of the surface on the backing at moderate temperature to remove the readily available liquid from the surface, said tacky dextran fixing the plasters and pads firmly on the skin when they are pressed on the skin with the tacky dextran surface in contact therewith.

3. A pressure-sensitive adhesive plaster for application to the skin comprising a backing and a surface on the backing consisting essentially of an effective amount of a rubifacient, a predominant amount of a dextran, and a relatively minor amount of a liquid hygroscopic agent compatible with the dextran and sufficient to maintain the dextran in a tacky condition for an indefinite period of time under normal temperature conditions after drying thereof to remove the readily available liquid from the surface, said tacky dextran fixing the plaster firmly on the skin when it is pressed on the skin with the tacky dextran surface in contact therewith.

4. A pressure-sensitive adhesive plaster for application to the skin comprising a backing and a surface on the backing consisting essentially of an effective amount of mustard powder, a predominant amount of a dextran, and a relatively minor amount of a liquid hygroscopic agent compatible with the dextran and sufficient to maintain the dextran in a tacky condition for an indefinite period of time under normal temperature conditions after drying thereof to remove the readily available liquid from the surface, said tacky dextran fixing the plaster firmly on the skin when it is pressed on the skin with the tacky dextran surface in contact therewith.

5. A pressure-sensitive adhesive article comprising a backing of woven glass fabric and a surface on the backing consisting essentially of a predominant amount of a dextran and a relatively minor amount of a liquid hydroscopic agent compatible with the dextran and sufficient to maintain the dextran in a tacky condition for an indefinite period of time under normal temperature conditios after drying of the surface on the backing at moderate temperature to remove the readily available liquid from the surface, said tacky dextran fixing the article firmly on a base when the article is pressed on a base with the tacky dextran surface in contact therewith.

6. A pressure-sensitive adhesive sealing tape comprising a backing and a surface on the backing consisting essentially of a predominant amount of a dextran and a relatively minor amount of a liquid hydroscopic agent compatible with the dextran and sufficient to maintain the dextran in a tacky condition for an indefinite period of time under normal temperature conditions after drying, of the surface on the backing at moderate temperature to remove the readily available liquid from the surface, said tacky dextran fixing the tape firmly on a base when the tape is pressed on a base with the tacky dextran surface in contact therewith.

7. A pressure-sensitive adhesive plaster for application to the skin comprising a backing and a surface on the backing consisting essentially of an effective amount of a rubefacient, a predominant amount of a dextran, and a relatively minor amount of glycerol sufficient to maintain the dextran in a tacky condition for an indefinite period of time under normal temperature conditions after drying thereof to remove the readily available liquid from the surface, said tacky dextran fixing the plaster firmly on the skin when it is pressed on the skin with the tacky dextran surface in contact therewith.

8. A pressure-sensitive adhesive plaster for application to the skin comprising a backing and a surface on the backing consisting essentially of an effective amount of a rubefacient, a predominant amount of dextran, and a relatively minor amount of ethylene glycol sufficient to maintain the dextran in a tacky condition for an indefinite period of time under normal temperature conditions after drying thereof to remove the readily available liquid from the surface, said tacky dextran fixing the plaster firmly on the skin when it is pressed on the skin with the tacky dextran surface in contact therewith.

9. A pressure-sensitive adhesive plaster for application to the skin comprising a backing and a surface on the backing consisting essentially of an effective amount of a rubefacient, a predominant amount of dextran, and a relatively minor amount of morpholine sufficient to maintain the dextran in a tacky condition for an indefinite period of time under normal temperature conditions after drying thereof to remove the readily available liquid from the surface, said tacky dextran fixing the plaster firmly on the skin when it is pressed on the skin with the tacky dextran surface in contact therewith.

10. The method of making a pressure-sensitive adhesive article which comprises spreading on a backing a viscous but spreadable mass consisting essentially of a predominant amount of a dextran and a liquid hydroscopic agent compatible with the dextran in an amount which is relatively minor but sufficient to maintain the dextran in a tacky condition for an indefinite period of time under normal temperature conditions after drying thereof on the backing at moderate temperature to remove the readily available liquid from the surface, and drying the mass on the backing at moderate temperature to remove the readily available liquid.

11. The method of making a pressure-sensitive article which comprises spreading on a backing a viscous but spreadable mass consisting essentially of a predominant amount of a dextran, water and a liquid hydroscopic agent compatible with the dextran in an amount which is relatively minor but sufficient to maintain the dextran in a tacky condition for an indefinite period of time under normal temperature conditions after drying thereof on the backing at moderate temperature to remove the readily available liquid from the surface, and drying the mass on the backing at moderate temperature to remove the readily available liquid.

12. The method of making a pressure-sensitive adhesive article which comprises spreading on a backing a viscous but spreadable mass consisting essentially of a predominant amount of a dextran and glycerol in an amount which is relatively minor but sufficient to maintain the dextran in a tacky condition for an indefinite period of time under normal temperature conditions after drying thereof on the backing at moderate temperature to remove the readily available liquid from the surface, and drying the mass on the backing at moderate temperature to remove the readily available liquid.

13. The method of making a pressure-sensitive adhesive article which comprises spreading on a backing a viscous but spreadable mass consisting essentially of a predominant amount of a dextran and ethylene glycol in an amount which is relatively minor but sufficient to maintain the dextran in a tacky condition for an indefinite period of time under normal temperature conditions after drying thereof on the backing at moderate temperature to remove the readily available liquid from the surface, and drying the mass on the backing at moderate temperature to remove the readily available liquid.

14. The method of making a pressure-sensitive adhesive article which comprises spreading on a backing a viscous but spreadable mass consisting essentially of a predominant amount of a dextran and morpholine in an amount which is relatively minor but sufficient to maintain the dextran in a tacky condition for an indefinite period of time under normal temperature conditions after drying thereof on the backing at moderate temperature to remove the readily available liquid from the surface, and drying the mass on the backing at moderate temperature to remove the readily available liquid.

References Cited in the file of this patent

UNITED STATES PATENTS

| | | |
|---|---|---|
| 79,811 | Crew | July 14, 1868 |
| 2,674,584 | Deniston | Apr. 6, 1954 |
| 2,768,096 | Toulmin | Oct. 23, 1956 |

OTHER REFERENCES

Owen, W. C.: "The Production of Gum Dextran," Sugar, August 1948, pp. 28, 29.